United States Patent
Chang

(10) Patent No.: US 6,707,206 B2
(45) Date of Patent: Mar. 16, 2004

(54) MAGNETIC MATERIAL FIXING STRUCTURE OF MOTOR ROTOR

(75) Inventor: Chio Sung Chang, Taichung (TW)

(73) Assignee: Energy Saving Tech. Corp., Taichung (TW)

( * ) Notice: Subject to any disclaimer, the term of this patent is extended or adjusted under 35 U.S.C. 154(b) by 0 days.

(21) Appl. No.: 10/052,543

(22) Filed: Jan. 23, 2002

(65) Prior Publication Data

US 2003/0137203 A1 Jul. 24, 2003

(51) Int. Cl.[7] ................................................ H02K 21/12
(52) U.S. Cl. ............................ 310/156.08; 310/156.01; 310/156.09; 310/156.11; 310/261; 310/264
(58) Field of Search ................................... 310/156, 216, 310/217, 261, 156.08, 156.09, 156.11, 156.18, 156.22, 156.19, 156.33, 156.56, 156.61

(56) References Cited

U.S. PATENT DOCUMENTS

| | | | | |
|---|---|---|---|---|
| 4,445,062 A | * | 4/1984 | Glaser ................... | 310/156.59 |
| 4,954,736 A | * | 9/1990 | Kawamoto et al. .... | 310/156.21 |
| 5,023,502 A | * | 6/1991 | Johnson ................. | 310/261 |
| 5,397,951 A | * | 3/1995 | Uchida et al. ......... | 310/156.21 |
| 5,760,520 A | * | 6/1998 | Hasebe et al. ......... | 310/156.19 |
| 5,828,152 A | * | 10/1998 | Takeda et al. ......... | 310/156.19 |
| 5,936,322 A | * | 8/1999 | Yamaguchi et al. ... | 310/156.19 |
| 5,939,809 A | * | 8/1999 | Mobius .................. | 310/156.28 |
| 6,239,525 B1 | * | 5/2001 | Matsunobu et al. ... | 310/156.38 |
| 6,472,789 B1 | * | 10/2002 | Akemakou ............. | 310/156.56 |

FOREIGN PATENT DOCUMENTS

| | | | | |
|---|---|---|---|---|
| JP | 08009599 A | * | 1/1996 | .......... H02K/15/03 |
| JP | 2001-169485 | * | 6/2001 | .......... H02K/21/14 |

* cited by examiner

Primary Examiner—Thomas M. Dougherty
Assistant Examiner—Yahveh Comas
(74) Attorney, Agent, or Firm—Rosenberg, Klein & Lee

(57) ABSTRACT

A magnetic material fixing structure of motor rotor including multiple overlapping silicon steel plates. An outer circumference of each silicon steel plate is recessed to form multiple receptacles at equal intervals. A magnetic material is disposed in each receptacle. The receptacle has two lateral faces, a bottom face and an opening opposite to the bottom face. Each of adjoining sections of the two lateral faces and the bottom face is formed with a dented section dividing the lateral faces and bottom face of each receptacle into multiple resilient plates. When inlaying the magnetic material into the receptacle, the resilient plates are deformed to resiliently tightly clamp the magnetic material.

1 Claim, 3 Drawing Sheets

MAGNETIC MATERIAL FIXING STRUCTURE OF MOTOR ROTOR

BACKGROUND OF THE INVENTION

The present invention is related to an improved magnetic material fixing structure of motor rotor. The rotor includes multiple overlapping silicon steel plates. Each silicon steel plate is formed multiple receptacles on outer circumference. Each receptacle has multiple resilient plates for resiliently tightly clamping and firmly fixing the magnetic material.

A conventional motor rotor is composed of multiple overlapping silicon steel plates. The circumference of each silicon steel plate is formed with multiple recesses at equal intervals. Each recess has a dimension slightly larger than a magnetic material, whereby the magnetic material can be painted with an adhesive and then inlaid and fixed therein.

After a period of use, the adhered magnetic material tends to detach from the silicon steel plate in high speed operation of the motor.

In order to solve the above problem, the magnetic material can be embedded in the silicon steel plate. Please refer to FIGS. 4 and 5. In another type of conventional motor rotor, the silicon steel plate 8 is formed with a central fixing hole 81 for a central shaft to pass therethrough. The outer circumference of each silicon steel plate 8 is formed with multiple through holes 82 at equal intervals. A magnetic material 9 is tightly fitted and fixedly embedded in the through hole 82.

In order to firmly fix the magnetic material 9 in the through hole 82, the through hole 82 is designed with a dimension smaller than that of the magnetic material 9. However, the magnetic material 9 is made of cracky material so that when forcedly pressed and embedded in the through hole 82, the magnetic material 9 is subject to cracking. This leads to a defective product.

Moreover, after embedded, the magnetic material 9 is tightly engaged with the periphery of the through hole 82. Therefore, the heat generated by the magnetic material 9 in operation of the rotor is not easy to radiate. The increased temperature will lead to decrement of magnetic energy of the magnetic material 9. In addition, a distance between the through hole 82 and the outer circumference of the silicon steel plate 8 is necessary for having sufficient strength to fix the magnetic material 9. However, this distance elongates the distance between the magnetic material 9 and the locator 91 around the rotor. Accordingly, the air gap H between the magnetic material 9 and the locator 91 is enlarged. This will lead to decrement of torque of the motor.

SUMMARY OF THE INVENTION

It is therefore a primary object of the present invention to provide an improved magnetic material fixing structure of motor rotor. An outer circumference of each silicon steel plate of the rotor is recessed to form multiple receptacles. Each receptacle has multiple resilient plates. When inlaying the magnetic material in the receptacle, the resilient plates are deformed to resiliently evenly tightly clamp the magnetic material so as to firmly fix the magnetic material.

It is a further object of the present invention to provide the above fixing structure in which when inlaying the magnetic material into the receptacle, the respective resilient plates are deformed to enlarge the receptacle, whereby it is easy to tightly fit and inlaid the magnetic material into the receptacle without damaging the magnetic material.

It is still a further object of the present invention to provide the above fixing structure in which after inlaid in the receptacle, the magnetic material is closer to the locator to reduce the air gap between the magnetic material and the locator. This increases the torque of the motor in operation.

It is a further object of the present invention to provide the above fixing structure in which the receptacle is divided by dented sections to form multiple resilient plates. Therefore, when the magnetic material is embedded in the receptacle and clamped by the resilient plates, the dented sections serve as ventilation passages for enhancing the heat-radiating efficiency of the magnetic material in operation of the motor. Moreover, a portion of the magnetic material at the opening of the receptacle is directly exposed to the air of the air gap between the rotor and locator. Therefore, the heat can be more easily dissipated so as to reduce the negative effect of the magnetic material caused by the heat.

The present invention can be best understood through the following description and accompanying drawings wherein:

DETAILED DESCRIPTION OF THE PREFERRED EMBODIMENT

Figure 1:
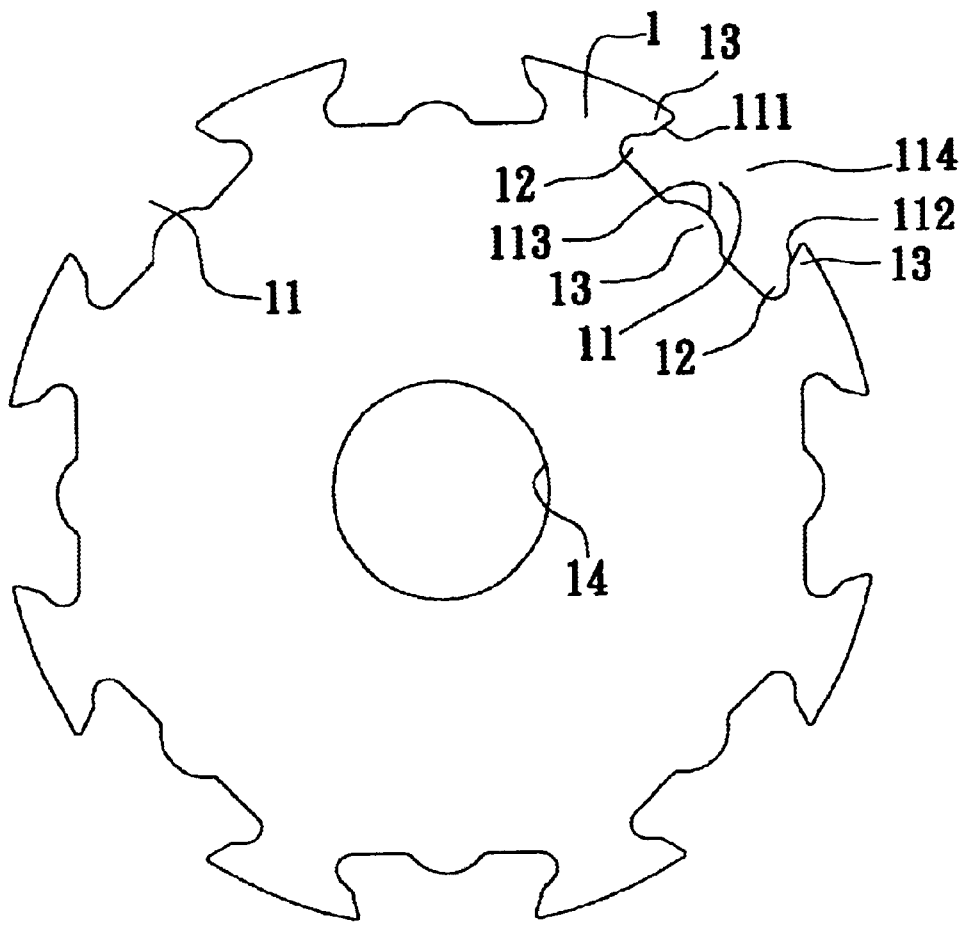
FIG. 1 is a plane view of the silicon steel plate of the present invention.
Figure 2:
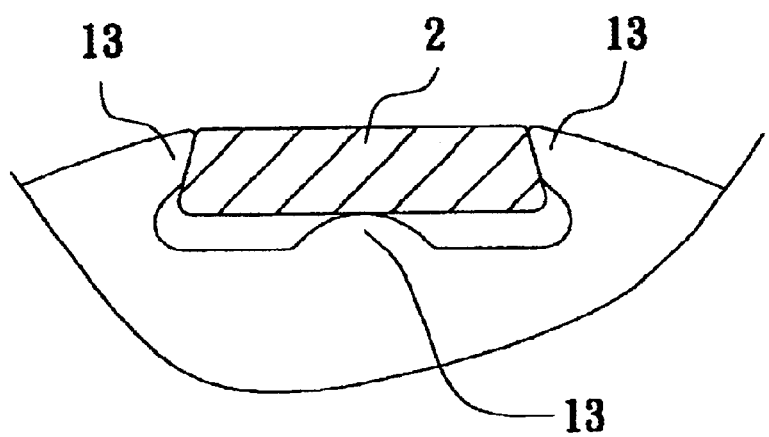
FIG. 2 is a view showing that a magnetic material is inlaid in a receptacle of the silicon steel plate of the present invention.
Figure 3:
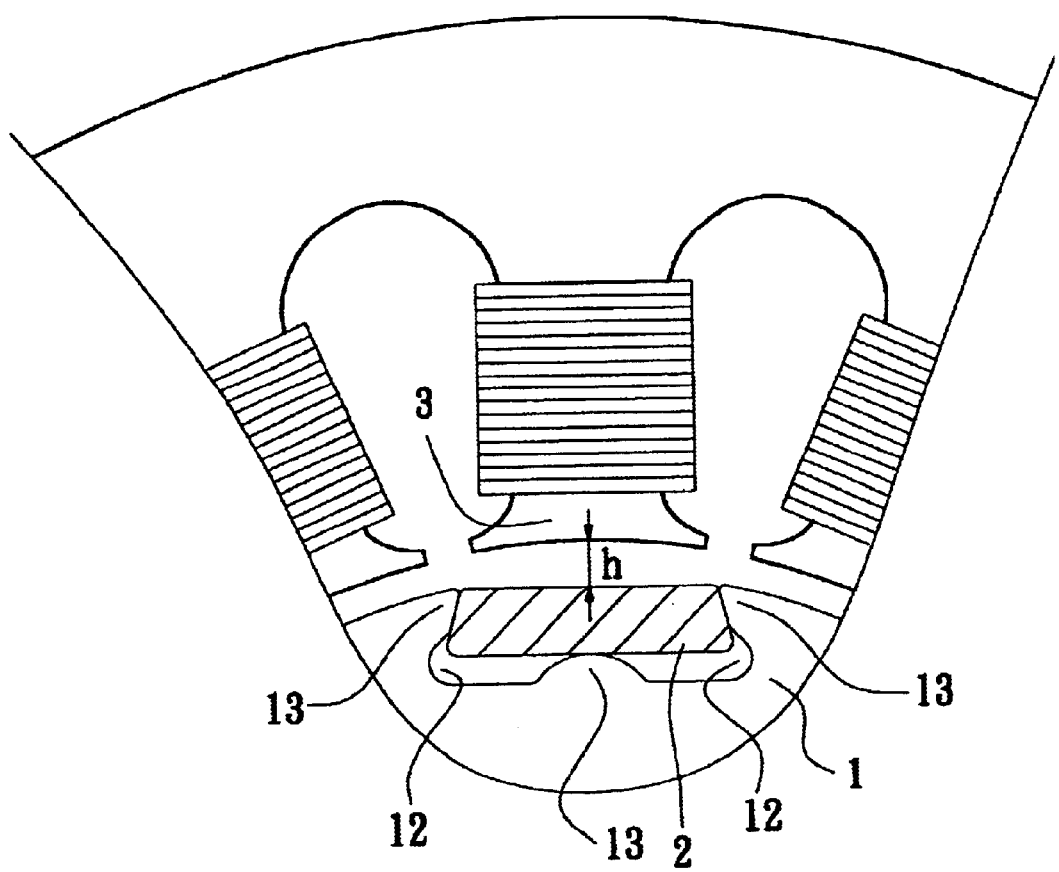
FIG. 3 is a view showing the relationship between the magnetic material inlaid in the silicon steel plate and the locator of the present invention.
Figure 4:
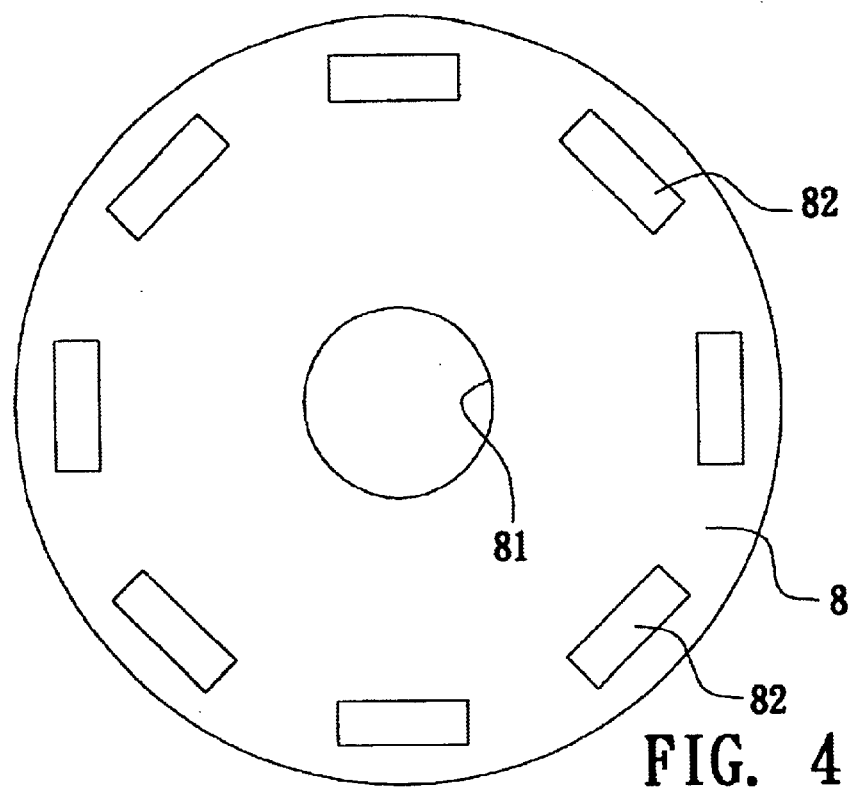
FIG. 4 is a plane view of the silicon steel plate of a conventional motor.
Figure 5:
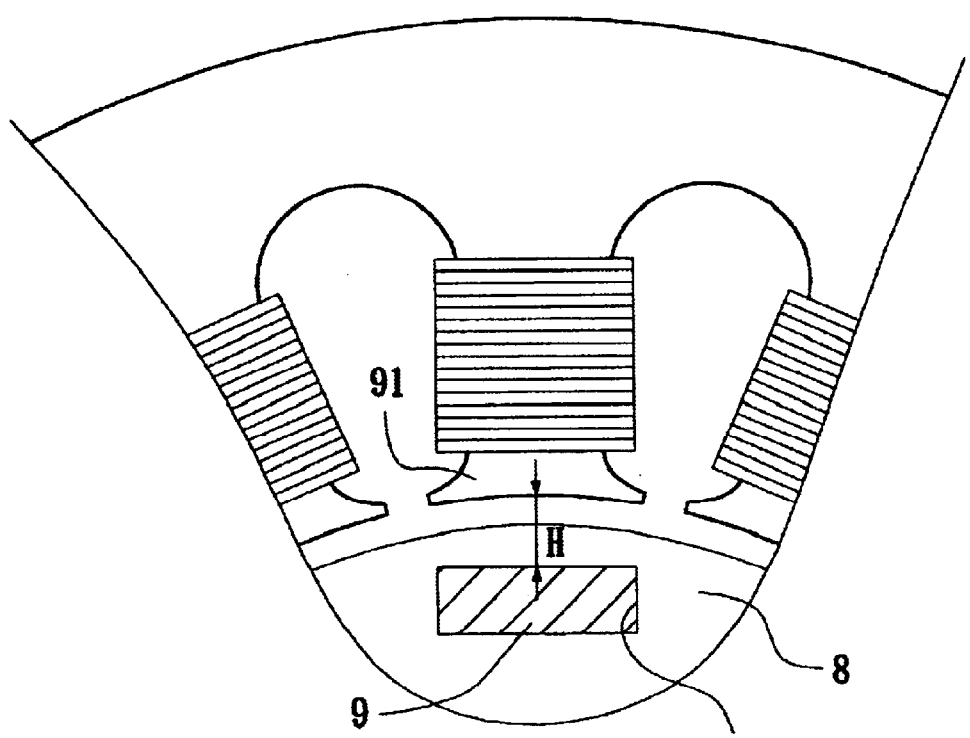
FIG. 5 is a view showing the relationship between the magnetic material inlaid in the silicon steel plate and the locator of the conventional motor.

Please refer to FIGS. 1 to 3. The motor rotor of the present invention is composed of multiple overlapping silicon steel plates 1. The outer circumference of each silicon steel plate 1 is recessed to form multiple receptacles 11 at equal intervals. A magnetic material 2 is disposed in each receptacle 11. The receptacle 11 and the silicon steel plate 1 define two lateral faces 111, 112, a bottom face 113 and an opening 114 opposite to the bottom face 113. The opening 114 is slightly smaller than the internal width of the receptacle 11 and the two lateral faces 111, 112 are slopes gradually diverging from outer side to inner side. The adjoining sections of the two lateral faces 111, 112 and the bottom face 113 are respectively formed with two dented sections 12. The two dented sections 12 divide the two lateral faces 111, 112 and the bottom face 113 of each receptacle 11 to form three resilient plates 13. The magnetic material 13 is tightly fitted between and held by the three resilient plates 13. In addition, the silicon steel plate 1 is formed with a central through hole 14 for a central shaft to pass therethrough.

When embedding the magnetic material 2, the respective resilient plates 13 are pressed and deformed by the magnetic material 2 to enlarge the receptacle 11. Accordingly, it is easy to tightly fit and inlaid the magnetic material 2 into the receptacle 11 without damaging the magnetic material 2. After the magnetic material 2 is embedded, the three resilient plates 13 are deformed to resiliently tightly clamp the magnetic material 2 and firmly locate the same. Furthermore, the opening 114 is slightly smaller than the internal width of the receptacle 11 so that the magnetic material 2 clamped by the three resilient plates 13 will not detach therefrom even when the motor operates at high speed.

Moreover, in the receptacle 11, only three resilient plates 13 abut against the magnetic material 2 and the respective dented sections 12 serve as ventilation passages. Also, a portion of the magnetic material 2 at the opening 114 is directly exposed to the air. Therefore, when the rotor rotates, the heat generated by the magnetic material 2 can be quickly taken away by the flowing air. Accordingly, the magnetic energy of the magnetic material 2 will not decline due to increased temperature. Furthermore, the receptacle 11 is inward recessed from outer circumference of the silicon steel plate 1. Therefore, the outer edge of the magnetic material 2 is very close to the outer circumference of the silicon steel plate 1 and thus the magnetic material 2 is closer to the locator 3 to reduce the air gap h between the magnetic material 2 and the locator 3 as shown in FIG. 3. This can increase the torque and efficiency of the operating motor.

According to the above arrangement, the present invention has the following advantages:

1. The resilient plates 13 of the receptacle 11 are deformed to resiliently tightly clamp the magnetic material 2 so as to firmly locate the magnetic material 2.
2. When inlaying the magnetic material 2 into the receptacle 11, the respective resilient plates 13 are deformed so that it is easy to tightly fit and inlaid the magnetic material 2 into the receptacle 11 without damaging the magnetic material 2.
3. After inlaid in the receptacle 11, the magnetic material 2 is closer to the locator 3 to reduce the air gap h between the magnetic material 2 and the locator 3. This increases the torque and efficiency of the motor.
4. When the magnetic material 2 is embedded in the receptacle 11, the dented sections 12 serve as ventilation passages. Moreover, a portion of the magnetic material 2 at the opening 114 is directly exposed to the air so as to enhance the heat-radiating efficiency of the magnetic material 2 in operation of the motor.

The above embodiment is only used to illustrate the present invention, not intended to limit the scope thereof. Many modifications of the above embodiment can be made without departing from the spirit of the present invention.

What is claimed is:

1. A magnetic material fixing structure of motor rotor, comprising at least one silicon steel plate, an outer circumference of the silicon steel plate being recessed to form multiple receptacles at equal intervals, a magnetic material being disposed in each receptacles, each receptacle and the silicon steel plate defining two lateral faces, a bottom face and an opening opposite to the bottom face, the opening of the receptacle being slightly smaller than an internal width of the receptacle and the two lateral faces being slopes gradually diverting from outer side to inside, each of adjoining sections of the two lateral faces and the bottom face being formed with a dented section, the dented sections dividing the two lateral faces and the bottom face of each receptacle to form multiple resilient plates, whereby the magnetic material is tightly fitted between the resilient plates, only three resilient plates abut against the magnetic material, the respective dented sections serve as ventilation passages, and a portion of the magnetic material at the opening is directly exposed to the air such that the heat generated by the magnetic material can be quickly taken away by the flowing air.

* * * * *